United States Patent [19]

Epple et al.

[11] Patent Number: 4,614,804
[45] Date of Patent: Sep. 30, 1986

[54] ANTHRAQUINOID DYES

[75] Inventors: Gerhard Epple; Reinhold Krallmann, both of Weisenheim; Wolf-Dieter Kermer, Fussgoenheim; Hans Weber, Hassloch, all of Fed. Rep. of Germany

[73] Assignee: Basf Aktiengesellschaft, Rheinland-Pfalz, Fed. Rep. of Germany

[21] Appl. No.: 531,995

[22] Filed: Sep. 14, 1983

[30] Foreign Application Priority Data

Sep. 14, 1982 [DE] Fed. Rep. of Germany ....... 3233948

[51] Int. Cl.[4] .......................................... C07D 277/82
[52] U.S. Cl. ..................... 548/160; 548/222; 8/677; 8/678; 260/377; 260/380
[58] Field of Search ............................... 548/160, 222

[56] References Cited

U.S. PATENT DOCUMENTS 3,313,823  4/1967  Simonnet ............................ 548/160
3,899,504  8/1975  Wessling ............................ 548/160

Primary Examiner—Robert Gerstl
Attorney, Agent, or Firm—Oblon, Fisher, Spivak, McClelland & Maier

[57] ABSTRACT

Dyes of the formula

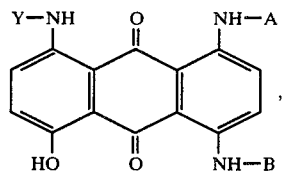

where A and B are H and/or

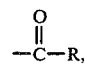

Y is unsubstituted or substituted phenyl,

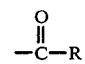

or unsubstituted or substituted benzothiazolyl or benzoxazolyl and R is unsubstituted or substituted alkyl, unsubstituted or substituted phenyl, or alkoxy, alkoxyalkoxy, phenalkyl or alkoxycarboalkyl, are suitable for dyeing and printing cellulose swollen with water-miscible swelling agents and cellulose-containing fiber material.

8 Claims, No Drawings

ANTHRAQUINOID DYES

BACKGROUND OF THE INVENTION

FIELD OF THE INVENTION

The present invention relates to novel anthraquinoid dyes based on α-tetrasubstituted anthraquinone.

SUMMARY OF THE INVENTION

The novel dyes have the formula

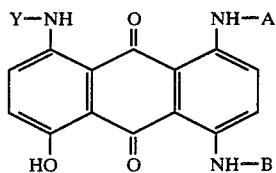
(I)

where A and B can be identical or different and each is hydrogen or

Y is

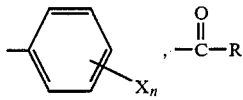

or benzothiazolyl or benzoxazoyl which is unsubstituted or substituted by chlorine, bromine, methoxy, ethoxy, nitro and/or amino, R is $C_1$–$C_{17}$-alkyl which is unsubstituted or substituted by chlorine or bromine, or is phenyl which is unsubstituted or substituted by chlorine, bromine, $C_1$–$C_4$-alkyl, methoxy, ethoxy, phenoxy or nitro, or is $C_1$–$C_{10}$-alkoxy, phenoxy, phenoxy-$C_1$–$C_3$-alkyl, where phenoxy is unsubstituted or substituted by 1 substituent or 2 or 3 identical or different substituents from the group comprising chlorine, bromine, methyl and ethyl, alkoxyalkoxy of 3 to 11 carbon atoms in total, $C_7$–$C_{10}$-phenalkyl or $C_1$–$C_4$-alkoxycarbonyl-$C_2$–$C_4$-alkyl, X is chlorine, bromine, $C_1$–$C_8$-alkyl, cyclohexyl, $C_1$–$C_4$-alkoxy, benzyl, benzyloxy trifluoromethyl, $C_1$–$C_6$-alkoxycarbonyl, alkoxyalkoxycarbonyl, where alkoxyalkoxy is of 3 to 8 carbon atoms, or phenyl or phenoxy which is unsubstituted or substituted by $C_1$–$C_4$-alkyl, chlorine or bromine, or is N-$C_1$–$C_{13}$-alkylcarbamyl or N,N-di-$C_1$–$C_{13}$-alkylcarbamyl and n is 0, 1, 2, 3, 4, or 5, and where, if n>1, the substituents can be identical or different.

The novel dyes can preferably be used for dyeing and printing cellulose swollen with water-miscible swelling agents and cellulose-containing fiber material, such as cellulose polyester, by the process described in German Pat. No. 1,811,796. Dyeings and prints in blue to greenish-blue hues with very good fastness properties, especially light-fastness, wet-fastness and rubbing-fastness, are obtained.

DESCRIPTION OF THE PREFERRED EMBODIMENTS

Examples of specific radicals R in the group

apart from those mentioned individually, are:

(a) $C_1$–$C_{17}$-alkyl which is unsubstituted or substituted by chlorine or bromine: methyl, ethyl, propyl, isopropyl, n-butyl, isobutyl, pentyl, hexyl, oct-1-yl, 2-ethylhexyl, hep-3-yl, decyl, dodecyl, tetradecyl, hexadecyl, chloromethyl, dichloromethyl, 2-chloroethyl, 3-chloropropyl and chlorobutyl;

(b) unsubstituted or substituted phenyl: phenyl, 2-, 3- or 4-methylphenyl, 2-, 3- or 4-ethylphenyl, 4-butylphenyl, 4-isopropylphenyl, 2-, 3- or 4-chlorophenyl, 4-bromophenyl, 4-methoxyphenyl, 4-ethoxyphenyl, 3- or 4-nitrophenyl and 4-phenoxyphenyl;

(c) $C_1$–$C_{10}$-alkoxy: methoxy, ethoxy, propoxy, n-butoxy, n-hexoxy, 2-ethylhexoxy, octoxy and isodecoxy;

(d) phenoxyalkyl: phenoxymethyl,

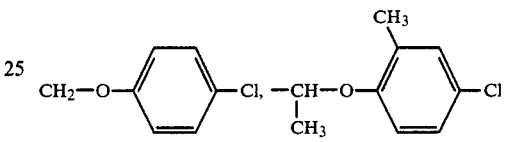

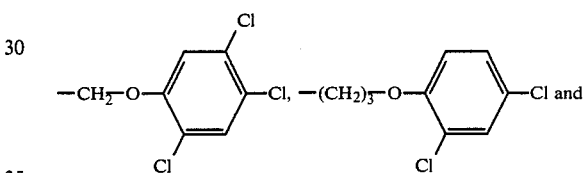

(e) alkoxyalkoxy of 3 to 11 carbon atoms in total: 2-methoxyethoxy, 2-ethoxyethoxy, 2-propoxyethoxy, 2-butoxyethoxy, (2'-ethylhexoxy)-ethoxy, 3-methoxypropoxy, 3-ethoxypropoxy, 3-butoxypropoxy and 3-(2'-ethylhexoxy)propoxy;

(f) $C_7$–$C_{10}$-phenalkyl: benzyl, 2-phenylethyl, 2-phenylpropyl, 3-phenylpropyl and phenylbutyl; and (g) $C_1$–$C_4$-alkoxycarbonyl-$C_1$–$C_4$-alkyL: methoxycarbonylethyl, ethoxycarbonylethyl, butoxycarbonylethyl, methoxycarbonylpropyl, ethoxycarbonylpropyl, butoxycarbonylpropyl, methoxycarbonylbutyl and butoxycarbonylbutyl.

Examples of specific substituents X if Y is

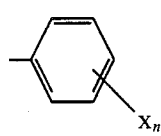

are: 2-, 3- or 4-methyl, 2-, 3- or 4-ethyl, 4-isopropyl, 4-tert.-butyl, 4-n-butyl, 4-n-octyl, 2-, 3- or 4-methoxy, 2-, 3- or 4-ethyoxy, 2,3-, 2,4-, 2,5-, 3,4- or 3,5-dimethyl, 2,4,6-trimethyl, 2,4,-, 2,5- or 3,5-dimethoxy, 3-isopropyl-4-methoxy, 2-, 3- or 4-chloro, 2-, 3- or 4-bromo, 3-trifluoromethyl, 2,3-, 2,4-, 2,5-, 3,4- or 3,5-dichloro, x-dichloro, x-trichloro, 2-chloro-4-methyl, 2-chloro-5- methyl, 3-chloro-2-methyl, 4-chloro-2-methyl, 5-chloro-2-methyl, 2-bromo-4-methyl, x-bromo-2-methyl, 2-chloro-5-methoxy, 5-chloro-2-methoxy, 2,4-dimethyl-6-bromo, 4-chloro-2,5-dimethoxy, 5-chloro-2,4-dimethoxy, 4-phenyl, 4-phenyl-3-methyl, 4-phenoxy, 4-benzyloxy, 4-(4′-chloro)-phenoxy, 3-methoxycarbonyl, 3-butoxycarbonyl, 3-ethoxycarbonyl, 3-(2′-ethylhexoxy)-carbonyl, N-methylcarbamyl, N-ethylcarbamyl, N,N-dimethylcarbamyl and N-n-octylcarbamyl.

The unsubstituted or substituted benzothiazolyl and benzoxazolyl radicals are based on, for example, benzothiazole and benzoxazole as well as their 5- or 6-chloro, 6-bromo, 5,6-dichloro, 4-, 5-, 6- or 7-methyl, 4-nitro, 6-ethoxy and 6-methoxy derivatives. Of these, unsubstituted benzothiazolyl and benzoxazolyl are preferred, for economic reasons. Dyes of the formula I which are preferred for technological and coloristic reasons are as follows:

(1) if Y is

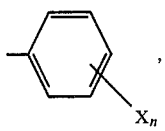

A and B are identical and each is

where X is chlorine or methyl, n is 0, 1, 2, 3 or 4 and $R^1$ is $C_1-C_4$-alkoxy or $C_2-C_{15}$-alkyl, and where, if $n>1$, the substituents can be identical or different;

(2) if A and B are hydrogen, Y is

where $R^2$ is $C_{10}-C_{16}$-alkyl; and (3) if A and B are

Y is likewise

where $R^3$ is $C_1-C_5$-alkoxy or $C_2-C_8$-alkyl.

Particularly preferred dyes are those under (1) where $R^1$ is methoxy, ethoxy, n-butoxy, ethyl, n-propyl or n-$C_{15}H_{31}$ and n is 0, 1, 2 or 3, those under (2) where $R^2$ is n-$C_{11}H_{23}$ or n-$C_{15}H_{31}$, and those under (3) where $R^3$ is ethoxy, n-butoxy, ethyl, n-propyl or hept-3-yl.

The dyes of the formula I where Y is

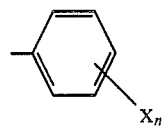

are prepared by reacting a 1-amino-8-arylamino-4,5-dihydroxyanthraquinone (II) with ammonia to give the 1,4-diamino-5-hydroxy-8-arylaminoanthraquinone (Ia) and then, if appropriate, introducing one or two

groups with an acylating agent:

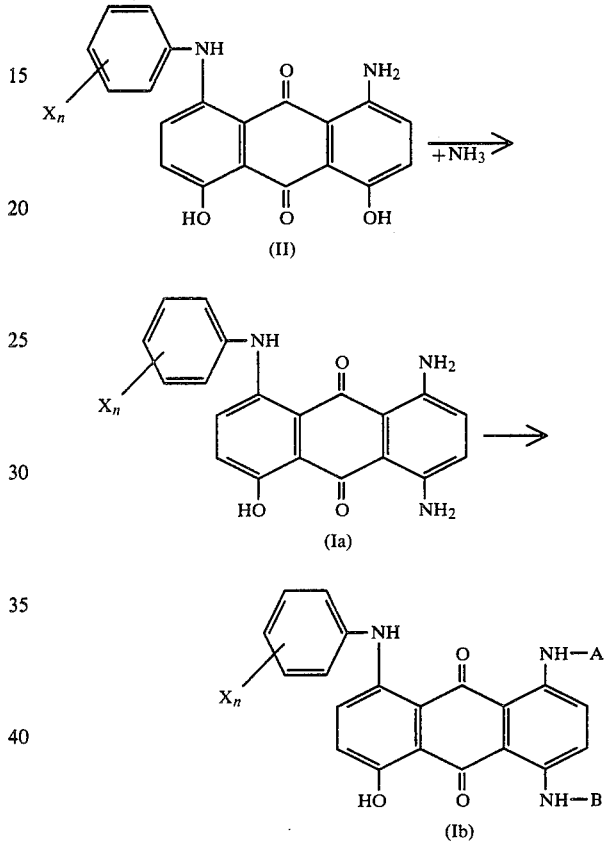

For the condensation of the compound II with ammonia, phenol, boric acid and toluene are first refluxed for from 1 to 8 hours, the water of reaction formed thereby being distilled off azeotropically. After addition of the anthraquinone compound II, the reaction mixture is heated at the reaction temperature, and gaseous ammonia is passed in at this temperature until no further starting material can be detected by thin-layer chromatography. The reaction is carried out at from 50° C. to the boiling point of the reaction mixture. The reaction times are from 15 minutes to 8 hours. For working up, the product in the reaction mixture is precipitated at from 60° C. to 90° C. with a diluent in which the product is insoluble or only sparingly soluble, and is isolated in a conventional manner.

The dyes of the formula I where Y is

are obtained by reacting a 1-amino-4,5-dihydroxy-8-acylaminoanthraquinone (III) with ammonia to give the 1,4-diamino-5-hydroxy-8-acylaminoanthraquinone (Ic) and, if appropriate, acylating this product:

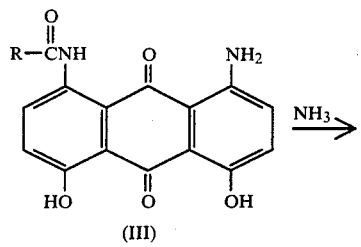

(III)

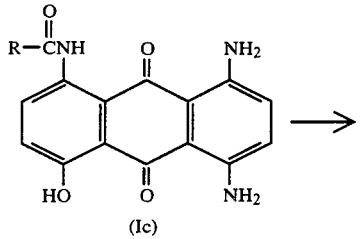

(Ic)

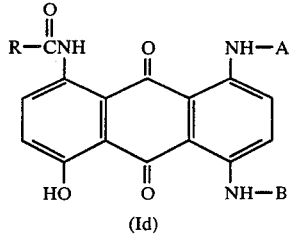

(Id)

For the reaction of a compound III with ammonia, phenol, boric acid and toluene are first refluxed for from 1 to 8 hours, the water of reaction formed thereby being distilled off azeotropically. From 1 to 3 moles of gaseous ammonia per mole of compound III to be reacted are then passed in. After addition of the anthraquinone compound III, the reaction mixture is heated at the reaction temperature and is kept at this temperature until no further starting material can be detected by thin-layer chromatography. The reaction is carried out at from 50° C. to the boiling point of the reaction mixture. The reaction times are from 15 minutes to 10 hours, and the reaction has usually ended after from 1 to 3 hours.

For working up, the product is precipitated from the reaction mixture at from 60° to 90° C. by addition of a diluent in which the product is insoluble or only sparingly soluble, and is isolated in a conventional manner.

The dyes I where Y is unsubstituted or substituted benzothiazolyl or benzoxazolyl are prepared in a similar manner.

The acylation is advantageously carried out by suspending the compound of the formula Ia or Ic in a liquid which is inert under the reaction conditions, heating the suspension to the reaction temperature and adding the acylating agent dropwise, while stirring. It is also possible to follow a procedure in which the acylating agent is added to the suspension at room temperature and the mixture is then heated to the reaction temperature. From 1.0 to 3.0 moles of acylating agent per mole of compound to be acylated are usually employed. The acylation is advantageously carried out at from room temperature to 180° C., preferably from 50° to 150° C. At these temperatures, the reaction has generally ended after from 0.2 to 6 hours.

Suitable acylating agents are compounds with which the radical

can be introduced into the amino group, e.g. carboxylic acid chlorides, bromides or anhydrides, chloroformates and acid chlorides of dicarboxylic acid monoesters.

Examples of organic liquids which are inert under the reaction conditions are aliphatic chlorohydrocarbons, such as chloroform, carbon tetrachloride, dichloroethane and tetrachloroethane, aromatic hydrocarbons, such as toluene and xylene, tetraalkylbenzenes ($^R$Solvesso), aromatic chlorohydrocarbons, such as chlorobenzene, o-dichlorobenzene and trichlorobenzene, N,N-dialkylcarboxylic acid amides, such as N,N-dimethylformamide and N,N-dimethylacetamide, N-methylpyrrolidone and also nitrobenzene and pyridine.

The amount of inert organic liquid is chosen so that the reaction mixture can be stirred or mixed, and in general from 2.5 to 15 times the amount by weight, based on the compound to be acylated, is sufficient.

For working up, the reaction mixture is cooled to room temperature and, if appropriate, the acylation product is precipitated by addition of a diluent in which the compound Ib or Id is insoluble or only sparingly soluble, and the product is isolated in a conventional manner.

The novel dyes are applied to cellulose fibers and cellulose-containing fiber materials by the processes described in German Pat. No. 1,811,796 and German Laid-Open Application Nos. DOS 2,524,243, DOS 2,528,743 and DOS 3,125,869.

In the following Examples, which illustrate the invention, parts and percentages are by weight.

EXAMPLE 1

(a) 17 parts (0.1 mole) of 2-chlorobenzothiazole are added to 27 parts (0.1 mole) of 1,8-diamino-4,5-dihydroxyanthraquinone in 150 parts of phenol, while stirring, and the mixture is heated at 130° for 3 hours. 1-benzothiazol-2'-ylamino-4,5-dihydroxy-8-aminoanthraquinone is thereby formed (solution 1).

(b) 150 parts of phenol, 12 parts (0.194 mole) of boric acid and 70 parts of toluene are refluxed for 3 hours, while stirring, the water of reaction formed thereby being removed from the system. The toluene is then distilled off. After the mixture has been cooled to 70° C., 4.3 parts (0.253 mole) of ammonia are passed in. Solution 1 (Example 1a), which has been heated to from 60° to 70° C., is then added and the reaction mixture is stirred at 90° C. until no further starting material can be detected by thin-layer chromatography (duration: 1 hour). The mixture is cooled to 70° C. and 160 parts of methanol are added. After cooling to room temperature, the reaction product precipitated is filtered off with suction. The material on the filter is washed with methanol and then with water, and dried. Yield: 35 parts of 1,4-diamino-5-hydroxy-8-benzothiazol-2'-lamino-anthraquinone (87.1% of theory).

Analysis: $C_{21}H_{14}N_4SO_3$ (402) Calculated: 62,7% C 3.5% H 12.0% O 13.9% N 8.0% S. Found: 62.3 3.3 13.0 7.7.

Melting point >260° C.

(c) 6.4 parts (0.06 mole) of butyryl chloride are added to 10.1 parts (0.025 mole) of 1,4-diamino-5-hydroxy-8- benzothiazol-2'-ylamino-anthraquinone in 50 parts of nitrobenzene, while stirring, and the mixture is heated at 120° C. for 2 hours. After cooling to room temperature, the reaction product precipitated is filtered off with suction and the material on the filter is washed with methanol and then with hot water and dried. 11.3 parts of the dye of the formula

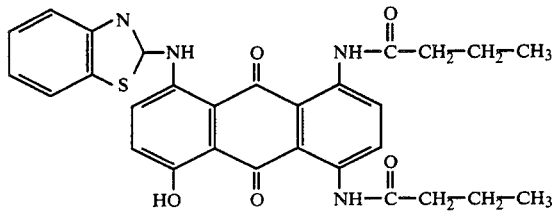

are obtained.

(d) 30 parts of the dye obtained in (c), 6 parts of lignin-sulfonate and 10 parts of dipropylene glycol are stirred in 50 parts of water and the suspension is ground in a sand mill until the particle size is 0.5 μm or less. 1 part of pentachlorophenol is then added and the dye content is adjusted to 30% (based on the formulation) by adding water.

(e) A printing paste is prepared from 10 parts of the formulation obtained in (d), 100 parts of polyethylene oxide of molecular weight 300 and 790 parts of a 3% strength alginate thickener. A cotton fabric is printed with this printing paste on a rotary screen printing machine and the print is dried at 100° C. It is then heated at 200° C. for 1 minute with hot air, rinsed cold, soaped at the boil, rinsed cold again, and dried. A reddish-blue wash-fast print on a white ground is obtained.

If a cotton/polyester mixed fabric is printed in the same manner, fixing and washing gives a print in which the two fibers are dyed in the same hue.

EXAMPLE 2

10.2 parts (0.075 mole) of butyl chloroformate and 8.0 parts (0.075 mole) of butyryl chloride are added to 20.1 parts (0.05 mole) of 1,4-diamino-5-hydroxy-8-benzothiazol-2'-ylamino-anthraquinone in 100 parts of nitrobenzene, while stirring, and the mixture is heated at 150° C. for 2 hours. After cooling to room temperature, the reaction product is precipitated with 320 parts of methanol, filtered off, washed with methanol and then with hot water and dried. 17 parts of a dye mixture of melting point 227° C. are obtained, and are converted into a formulation as described in Example (1d). The formulation is applied to polyester/cotton as described in Example (1e) to give a reddish-blue light-fast and washfast print on a white ground.

EXAMPLE 3

120 parts of phenol, 6.1 parts (0.1 mole) of boric acid and 70 parts of toluene are refluxed, while stirring, the water of reaction formed thereby being removed from the system. The toluene is then distilled off, the mixture is cooled to 110° C. and 25.4 parts (0.05 mole) of 1-palmitylamino-8-amino-4,5-dihydroxyanthraquinone (prepared by reacting 1-amino-8-nitro-4,5-dihydroxyanthraquinone with palmityl chloride in nitrobenzene and then reducing the product with hydrazine hydrate) are added. Ammonia is then passed in at this temperature until no further starting material can be detected in the thin-layer chromatogram (duration: 3 hours). The reaction mixture is cooled to 90° C. and 240 parts of methanol are added. After cooling to room temperature, the dye precipitated is filtered off with suction and the material on the filter is washed with methanol and water and dried. 20 parts of 1,4-diamino-5-hydroxy-8-palmitylaminoanthraquinone of melting point 174° C. are obtained.

Analysis: $C_{30}H_{41}N_3O_4$ (507): Calculated: 71.0% C 8.1% H 12.6% O 8.3% N. Found: 68.9 7.8 8.2.

If the dye is applied to cotton by the process described in German Laid-Open Application No. DOS 3,125,869, a clear blue print with good fastness properties is obtained.

The dyes mentioned in the following Table were prepared as described in Example 1, 2 or 3, converted to aqueous formulations and used for dyeing and/or printing cotton or cotton/polyester blends. The hues of the dyeings obtained on cotton or cotton/polyester fiber mixtures are shown in the right-hand column.

| Ex. | Y— | A— | B— | m.p. [°C.] | Hue on C and C/PES |
|---|---|---|---|---|---|
| 4 | $CH_3-(CH_2)_{10}-\overset{O}{\underset{\|\|}{C}}-$ | H— | H— | 176–186 | blue |
| 5 | 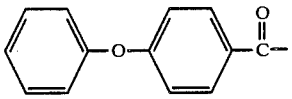 | H— | H— | >260 | blue |
| 6 | 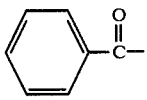 | mixture of 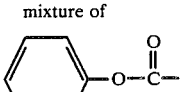 and H— | H— | >260 | bluish violet |
| 7 | 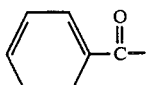 | mixture of $C_4H_9O-\overset{O}{\underset{\|\|}{C}}-$ and H— | $H_9C_4-O-\overset{O}{\underset{\|\|}{C}}-$ | from 212 | blue |

-continued

| Ex. | Y— | A— | B— | m.p. [°C.] | Hue on C and C/PES |
|---|---|---|---|---|---|
| 8 | C₆H₅—C(=O)— | H— | H— | | blue |
| 9 | CH₃—(CH₂)₃—CH(C₂H₅)—C(=O)— | CH₃—CH₂—CH₂—C(=O)— | CH₃—CH₂—CH₂—C(=O)— | 208 | reddish violet |
| 10 | CH₃—(CH₂)₃—CH(C₂H₅)—C(=O)— | CH₃(CH₂)₃—O—C(=O)— | CH₃(CH₂)₃—O—C(=O)— | 175 | violet |
| 11 | CH₃(CH₂)₃—CH(C₂H₅)—C(=O)— | mixture of CH₃—CH₂—O—C(=O)— and CH₃—CH₂—CH₂—C(=O)— | CH₃—CH₂—O—C(=O)— and CH₃—CH₂—CH₂—C(=O)— | | violet |
| 12 | CH₃—(CH₂)₁₀—C(=O)— | CH₃—CH₂—C(=O)— | CH₃—CH₂—C(=O)— | | violet |
| 13 | CH₃—(CH₂)₁₄—C(=O)— | CH₃—CH₂—CH₂—C(=O)— | CH₃—CH₂—CH₂—C(=O)— | | violet |
| 14 | benzothiazol-2-yl | mixture of CH₃—CH₂—C(=O)— and H₃C—CH₂—O—C(=O)— | CH₃—CH₂—O—C(=O)— and H₃C—CH₂—C(=O)— | 248 | reddish blue |
| 15 | benzothiazol-2-yl | mixture of C₄H₉—CH(C₂H₅)—C(=O)— and H₃C—CH₂—C(=O)— | CH₃—CH₂—C(=O)— and H₉C₄—CH(C₂H₅)—C(=O)— | 212 | reddish blue |
| 16 | 6-chlorobenzothiazol-2-yl | CH₃—CH₂—CH₂—C(=O)— | CH₃—CH₂—CH₂—C(=O)— | 218 | reddish blue |
| 17 | benzothiazol-2-yl | mixture of C₆H₅—C(=O)— and H— | H— and C₆H₅—C(=O)— | >260 | blue |
| 18 | benzothiazol-2-yl | C₆H₅—O—CH₂—C(=O)— | C₆H₅—O—CH₂—C(=O)— | >260 | dull blue |

-continued

| Ex. | Y— | A— | B— | m.p. [°C.] | Hue on C and C/PES |
|---|---|---|---|---|---|
| 19 |  | C₄H₉O—C(=O)— | C₄H₉O—C(=O)— | 216 | blue |
| 20 |  | mixture of CH₃(CH₂)₂C(=O)— and H₃C—(CH₂)₆—C(=O)— | CH₃—(CH₂)₆—C(=O)— H₃C—(CH₂)₂—C(=O)— | 210 | reddish blue |
| 21 |  | mixture of CH₃(CH₂)₂C(=O)— and PhO—CH₂—C(=O)— | PhO—CH₂—C(=O)— H₃C—(CH₂)₂—C(=O)— | 224 | reddish blue |
| 22 | 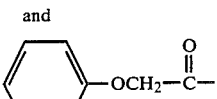 | C₄H₉—CH(C₂H₅)—C(=O)— | C₄H₉—CH(C₂H₅)—C(=O)— | 131 | reddish blue |
| 23 | 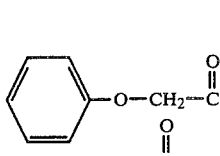 | CH₃—CH₂—CH₂—C(=O)— | CH₃—CH₂—CH₂—C(=O)— | >260 | reddish blue |
| 24 |  | C₄H₉—O—C(=O)— | C₄H₉—O—C(=O)— | 240 | reddish blue |
| 25 |  | CH₃—C(=O)— | CH₃—C(=O)— | >260 | blue |
| 26 |  | CH₃—O—C(=O)— | CH₃—O—C(=O)— | >260 | dull blue |

EXAMPLE 27

(a) 120 parts of phenol, 12 parts (0.194 mole) of boric acid and 70 parts of toluene are refluxed for 3 hours, while stirring. The water of reaction formed is thereby removed from the system. After the toluene has been distilled off, the reaction mixture is cooled to 100° C. After addition of 34.6 parts (0.1 mole) of 1-amino-4,5-dihydroxy-8-phenylaminoanthraquinone the mixture is heated at 100° C., and 4.5 parts (0.264 mole) of gaseous ammonia are passed in at this temperature. The reaction mixture is subsequently stirred at the same temperature for 2 hours and cooled to 90° C., and 280 parts of methanol are added. After cooling to room temperature, the reaction product precipitated is filtered off with suction, washed with methanol and water and dried. Yield: 20 parts of 1,4-diamino-5-hydroxy-8-phenylaminoanthraquinone (58% of theory), of melting point 234° C.

(b) 18.9 parts (0.2 mole) of methyl chloroformate are added to 17.25 parts (0.05 mole) of the anthraquinone compound obtained in (a) in 100 parts of nitrobenzene and the mixture is stirred at from 120° to 130° C. for 4 hours. After cooling to 80° C., the reaction product is precipitated by addition of 320 parts of methanol and the precipitate is filtered off with suction, washed with methanol and water and dried. Yield: 15 parts of the dye of the formula

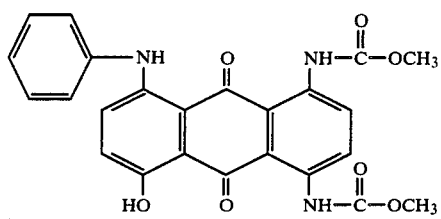

Melting point: 248° C.

Analysis: $C_{24}H_{19}N_3O_7$ (molecular weight 461): Calculated: 62.5% C 4.1% H 9.1% N. Found: 62.4% C 4.1% H 9.5% N.

(c) 30 parts of the dye obtained according to (b), 6 parts of lignin-sulfonate and 10 parts of dipropylene glycol are stirred in 50 parts of water and the suspension is ground in a sand mill until the particle size is 0.5 μm or less. 1 part of pentachlorophenol is then added and the dye content is adjusted to 30% (based on the formulation) by adding water.

(d) A printing paste is prepared from 10 parts of the formulation obtained in (c), 100 parts of polyethylene oxide ($\overline{M}=300$) and 790 parts of a 3% strength alginate thickener.

(e) A cotton fabric is printed with the printing paste prepared in (d) on a rotary screen printing machine and the print is dried at 100° C. It is then heated at 200° C. for 1 minute with hot air and subsequently rinsed cold, soaped at the boil, rinsed cold again and dried. A blue wash-fast print on a white ground is obtained.

If a cotton/polyester mixed fabric is printed in the same manner, fixing and washing give a print in which the two fibers are dyed in the same hue.

EXAMPLE 28

20.45 parts (0.15 mole) of butyl chloroformate are added to 17.25 parts (0.05 mole) of 1,4-diamino-5-hydroxy-8-phenylaminoanthraquinone (Example 22a) in 100 parts of nitrobenzene and the mixture is stirred at from 120° to 130° C. for 2 hours. After cooling to room temperature, 37.5 parts of sulfuryl chloride are added dropwise and stirring is continued for 2 hours. The reaction product is precipitated with 240 parts of methanol and the precipitate is filtered off with suction, washed with methanol and water and dried. Yield: 26 parts of a dark powder of melting point 208° C., which has a chlorine content of 23% and dyes cotton/polyester mixed fabric in a clear blue hue with good fastness properties.

The dyes listed in the following Table were prepared as described in Examples 27 and 28, converted to aqueous formulations and used for dyeing and/or printing cotton or cotton/polyester blends. The hues of the dyeings obtained on cotton (C) or cotton/polyester fiber mixtures (C/PES) are given in the right-hand column.

| Ex. | Y— | A— | B— | m.p. [°C.] | Hue on C and C/PES |
|---|---|---|---|---|---|
| 29 | phenyl | $C_4H_9O\text{—}\underset{\underset{O}{\|\|}}{C}\text{—}$ | $C_4H_9O\text{—}\underset{\underset{O}{\|\|}}{C}\text{—}$ | 220 | blue |
| 30 | phenyl-Br$_2$ | $CH_3\text{—}O\text{—}\underset{\underset{O}{\|\|}}{C}\text{—}$ | $CH_3\text{—}O\text{—}\underset{\underset{O}{\|\|}}{C}\text{—}$ | 208 | blue |
| 31 | phenyl-Cl$_2$ | $\text{phenyl—}O\text{—}CH_2\text{—}\underset{\underset{O}{\|\|}}{C}\text{—}$ | $\text{phenyl—}O\text{—}CH_2\text{—}\underset{\underset{O}{\|\|}}{C}\text{—}$ | 236 | blue |
| 32 | phenyl-Cl, Cl | $CH_3\text{—}CH_2\text{—}CH_2\text{—}\underset{\underset{O}{\|\|}}{C}\text{—}$ | $CH_3\text{—}CH_2\text{—}CH_2\text{—}\underset{\underset{O}{\|\|}}{C}\text{—}$ | 250 | dull blue |
| 33 | phenyl-Cl | $CH_3\text{—}\underset{CH_3}{\underset{\|}{CH}}\text{—}\underset{\underset{O}{\|\|}}{C}\text{—}$ | $CH_3\text{—}\underset{CH_3}{\underset{\|}{CH}}\text{—}\underset{\underset{O}{\|\|}}{C}\text{—}$ | 196–200 | blue |
| 34 | phenyl-COOCH$_3$ | $C_4H_9O\text{—}\underset{\underset{O}{\|\|}}{C}\text{—}$ | $C_4H_9O\text{—}\underset{\underset{O}{\|\|}}{C}\text{—}$ | 250 | blue |

-continued

| Ex. | Y— | A— | B— | m.p. [°C.] | Hue on C and C/PES |
|---|---|---|---|---|---|
| 35 | 4-Br-C₆H₄— (1.65) | C₆H₅—O—CH₂—C(O)— | C₆H₅—O—CH₂—C(O)— | 266 | blue |
| 36 | Cl-C₆H₄— | C₆H₅—C(O)— | C₆H₅—C(O)— | 222 | cloudy greenish-blue |
| 37 | 2,4-Cl₂-C₆H₃— | $C_4H_9O$—C(O)— | $C_4H_9O$—C(O)— | 250 | blue |
| 38 | 2,4,5-(CH₃)₃-C₆H₂— | $CH_3$—$CH_2$—C(O)— | $CH_3$—$CH_2$—C(O)— | 224 | blue |
| 39 | C₆H₅— | $CH_3$—$(CH_2)_{14}$—C(O)— | $CH_3$—$(CH_2)_{14}$—C(O)— | 132 | blue (C) |
| 40 | C₆H₅— | 2,4-Cl₂-C₆H₃—O—$(CH_2)_3$—C(O)— | 2,4-Cl₂-C₆H₃—O—$(CH_2)_3$—C(O)— | 186 | greenish blue |
| 41 | 4-($C_8H_{17}$—HN—C(O)—)-C₆H₄— | H— | H— | 206 | bluish green |
| 42 | 4-(($CH_3)_2$CH)-C₆H₄— | $CH_3$—$CH_2$—$CH_2$—C(O)— | $CH_3$—$CH_2$—$CH_2$—C(O)— | 130 | blue |
| 43 | 3-($CH_3OOC$)-C₆H₄— | H— | H— | 250–264 | blue |
| 44 | 3,4-Cl₂-C₆H₃— | $C_4H_9O$—C(O)— | $C_4H_9O$—C(O)— | 260 | cloudy greenish-blue |
| 45 | 3-$CF_3$-C₆H₄— | $CH_3O$—C(O)— | $CH_3O$—C(O)— | 267 | reddish blue |

-continued

| Ex. | Y— | A— | B— | m.p. [°C.] | Hue on C and C/PES |
|---|---|---|---|---|---|
| 46 | phenyl with Cl₃ and OCH₃ substituents | C₄H₉O—C(=O)— | C₄H₉O—C(=O)— | 220 | blue |
| 47 | phenyl with Cl₂ substituents | C₄H₉—CH(C₂H₄)—C(=O)— | C₄H₉—CH(C₂H₅)—C(=O)— | 96 | blue |
| 48 | phenyl | 4-Cl-C₆H₄—O—CH(CH₃)—C(=O)— | 4-Cl-C₆H₄—O—CH(CH₃)—C(=O)— | 168 | blue |
| 49 | phenyl | 2,4,5-trichlorophenyl—O—CH₂—C(=O)— | 2,4,5-trichlorophenyl—O—CH₂—C(=O)— | 260 | cloudy blue |
| 50 | phenyl | mixture of —C(=O)— and CH₃—(CH₂)₂—C(=O)— | CH₃—CH₂—CH₂—C(=O)— and C₆H₅—C(=O)— | 190 | blue |
| 51 | phenyl | mixture of C₆H₅—C(=O)— and 2-benzothiazolyl | 2-benzothiazolyl and C₆H₅—C(=O)— | 174 | greenish blue |
| 52 | phenyl with C₂H₅ substituent | CH₃—CH₂—C(=O)— | CH₃—CH₂—C(=O)— | 222 | greenish blue |
| 53 | phenyl with C(CH₃)₃ substituent | CH₃—CH₂—C(=O)— | CH₃—CH₂—C(=O)— | 230 | blue |
| 54 | phenyl with (H₃C)₂ substituents | CH₃—(CH₂)₆—C(=O)— | CH₃—(CH₂)₆—C(=O)— | 166 | blue |

| Ex. | Y— | A— | B— | m.p. [°C.] | Hue on C and C/PES |
|---|---|---|---|---|---|
| 55 | 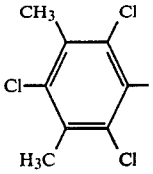 | 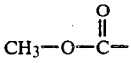 CH₃—O—C— | 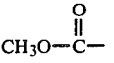 CH₃O—C— | 230 | bluish violet |

We claim:

1. A dye of the formula

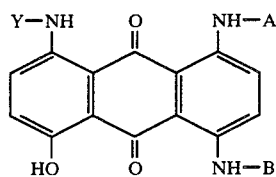

wherein
A and B are each

Y is benzothiazolyl, 2-chlorobenzothiazolyl or 5- or 6-chloro, 6-bromo, 5,6-dichloro, 4-, 5-, 6- or 7-methyl, 4-nitro, 6-ethoxy or 6-methoxybenzothiazolyl; or is benzoxazolyl wherein R is $(C_1-C_{17})$alkyl which may be substituted by chlorine or bromine, phenyl which may be substituted by chlorine, bromine, $(C_1-C_4)$alkyl, methoxy, ethoxy, phenoxy or nitro, $(C_1-C_{10})$alkoxy, phenoxy, phenoxy$(C_1-C_3)$alkyl which may be substituted by 1 to 3 identical or different substituents selected from the group consisting of chlorine, bromine, methyl and ethyl, alkoxyalkoxy of 3 to 11 carbon atoms, $(C_7-C_{10})$phenalkyl or $(C_1-C_4)$alkoxycarbonyl$(C_2-C_4)$alkyl.

2. The dye of claim 1, wherein Y is unsubstituted benzothiazolyl.

3. The dye of claim 1, wherein Y is 2-chlorobenzothiazoly.

4. The dye of claim 1, wherein Y is selected from the group consisting of 5- or 6-chloro, 6-bromo, 5,6-dichloro, 4-, 5-, 6- or 7-methyl, 4-nitro, 6-ethoxy and 6-methoxybenzothiazolyl.

5. The dye of claim 1, wherein Y is unsubstituted benzoxazolyl.

6. The dye of claim 1, being

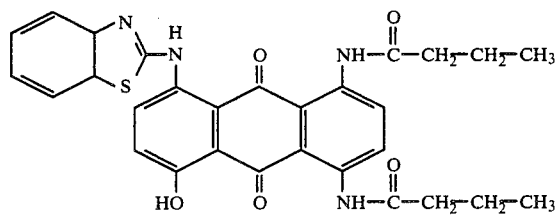

7. The dye of claim 1, being

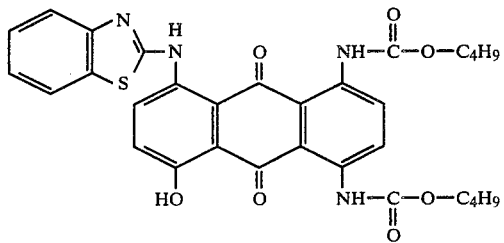

8. The dye of claim 1, wherein Y is benzothiazolyl; and A and B are a mixture of butyr

* * * * *